(12) United States Patent
Wimmer

(10) Patent No.: US 6,807,495 B2
(45) Date of Patent: Oct. 19, 2004

(54) PLAUSIBILITY CHECKING OF VOLTAGE TRANSFORMERS IN SUBSTATIONS

(75) Inventor: Wolfgang Wimmer, Rietheim (CH)

(73) Assignee: ABB Schweiz AG, Baden (CH)

( * ) Notice: Subject to any disclaimer, the term of this patent is extended or adjusted under 35 U.S.C. 154(b) by 52 days.

(21) Appl. No.: 10/373,029

(22) Filed: Feb. 26, 2003

(65) Prior Publication Data

US 2003/0167138 A1 Sep. 4, 2003

(30) Foreign Application Priority Data

Mar. 1, 2002 (EP) .......................................... 02405148

(51) Int. Cl.[7] .............................................. G01R 19/00
(52) U.S. Cl. ............................ 702/64; 702/58; 702/59; 324/512; 324/522; 324/537; 324/772; 324/546; 324/547
(58) Field of Search ............................. 702/64, 58, 59; 324/512, 522, 537, 772, 546, 547

(56) References Cited

U.S. PATENT DOCUMENTS

| 4,897,607 A | * | 1/1990 | Grunewald et al. | 324/512 |
|---|---|---|---|---|
| 5,798,939 A | * | 8/1998 | Ochoa et al. | 700/286 |
| 6,292,717 B1 | * | 9/2001 | Alexander et al. | 700/293 |
| 2002/0059477 A1 | * | 5/2002 | Wimmer et al. | 710/1 |

FOREIGN PATENT DOCUMENTS

EP 1069518 A1 1/2001

* cited by examiner

Primary Examiner—John Barlow
Assistant Examiner—Anthony T. Dougherty
(74) Attorney, Agent, or Firm—Burns, Doane, Swecker & Mathis, L.L.P.

(57) ABSTRACT

The invention relates to a method, a computer program product, a computer program and a device (20) for the plausibility checking of voltage transformers (8) in an electrical switchgear (1) as well as a switchgear (1) with such a device (20). According to the invention, a topological sub-area (1a; 1b) with several galvanically connected voltage transformers (8) is recorded for an instantaneous topology of the switchgear (1), groups of voltage transformers (8) with the same measured signals are identified and, if more than one group is present, an indication or alarm signal is generated by the substation control system (2). Amongst other things, exemplary embodiments relate to: Criteria for the production of warning or alarm messages for problematic voltage transformers (8) and/or sub-areas (1a; 1b); presentation of the results of the plausibility test; coordination of the plausibility test with switching operations. Advantages are, amongst others: Method independent of complexity and operating state of the switchgear (1); dynamic tracking of the topology; high meaningfulness of the plausibility test; and use of measured voltage values already available in the control system (2).

17 Claims, 2 Drawing Sheets

PLAUSIBILITY CHECKING OF VOLTAGE TRANSFORMERS IN SUBSTATIONS

This application claims priority under 35 U.S.C. §§ 119 and/or 365 to application Ser. No. 02405148.4 filed in Europe on Mar. 1, 2002; the entire content of which is hereby incorporated by reference.

FIELD OF THE INVENTION

The invention relates to the field of system control technology, in particular to the substation control technology for high, medium or low voltage switchgears. It is based on a method, a computer program product, a computer program and a device for checking the plausibility of voltage transformers in an electrical switchgear as well as on a switchgear comprising such a device according to the pre-characterizing clause of the independent patent claims.

BACKGROUND OF THE INVENTION

A power supply network comprises substations or electrical switchgears, in particular high or medium voltage switchgears, which are controlled by a distributed substation control system. The substations include primary or field devices, e.g. switches, drives, generators, transformers, voltage transformers and current transformers. The control system has, for example, field control devices and an operator station, which are connected to one another by means of various communication busses and bus couplers. The field control devices control, adjust, monitor and protect the field devices in the system.

Voltage transformers in substations measure the system voltages at prescribed measuring points in the switchgear system with a certain measuring inaccuracy. The measured voltage values are filtered, are scaled to primary voltage values of the system, are digitized if necessary, are recorded by the control system as voltage measuring signals and are presented on a display and/or are used for calculation purposes. Additional rate-of-change filtering for communication purposes can, for example, include time averaging by means of integration or an algorithm for deciding whether to update or to maintain and to transmit or not to transmit the voltage value. Both the measured values recorded by the voltage transformer and the parameters for filtering and scaling, i.e. the so-called parametrisation of the measured values, can be subject to errors. Primary errors in the voltage transformer itself occur, for example, due to defective parts or material fatigue. Errors in the parametrisation can be caused in the electronics by external influences, aging, drift, operator error or similar.

For protection purposes and for the synchro check, it is known to monitor the voltage transformer fuse and also to carry out local plausibility tests at an isolated point of the switchgear. The known plausibility tests, which are referred to a single measuring point, are a comparative test of current and voltage values, a check on the phase sequence of the phase voltages, a phase symmetry test or a voltage symmetry test. In the comparative test, serious inconsistencies between voltage and current values at the measuring point can be detected. When monitoring the phase sequence, inconsistencies between the time evolution of voltages of different phases at the measuring point can be detected. In the phase symmetry test, voltage maxima of all three phases at the measuring point are checked with respect to their phase position relative to one another and deviations from a maximum phase shift are detected. This test works only if not too large maximum values for the permissible asymmetry can be specified. Furthermore, this test is normally impossible when transducers are used for digitizing the voltages, as these provide, instead of the required instantaneous values, time-averaged RMS values of the voltage, power, frequency or phase angle. In the voltage symmetry test, all phase-to-phase voltages and the zero voltage are summed and deviations from the ideal value of zero are monitored. These local plausibility tests are relatively coarse and allow only a yes/no decision about the operativeness of the voltage transformer or the voltage transformers at the measuring point. On the other hand, a loss of measuring accuracy or an incorrect scaling cannot be detected.

At network control level, in a so-called "state estimation", plausibility tests on power and voltage values are also known in order, for example, to compensate for inconsistencies due to measurements at different points in time or due to measuring errors, However, such plausibility tests are not suitable for detecting accuracy or scaling problems with voltage transformers, because it is practically impossible to identify the true reason for the deviation. In addition, a state estimation is too elaborate, from the point of view of both the required computational power and the configuration, to be used just for the detection of voltage transformer problems in a substation.

SUMMARY OF THE INVENTION

The object of the present invention is to specify a method, a computer program product, a computer program a device and an electrical switchgear with such a device for the improved and simplified monitoring of voltage transformers in electrical switchgears. According to invention, this object is achieved by the features of the independent claims.

In a first aspect, the invention consists in a method for the plausibility checking of voltage transformers in an electrical switchgear, in particular a high or medium voltage switchgear, the switchgear being controlled by a substation or switchgear control system and measured signals from voltage transformers arranged at least two different measuring points being processed by the control system, the following steps for testing the plausibility of the voltage transformers being carried out: (i) recording by means of the control system of an instantaneous topology of the switchgear based on the existing electrical connections of primary devices and based on the instantaneous positions of switches; (ii) identifying, based on the instantaneous topology, at least one sub-area of the switchgear, which has at least two galvanically connected voltage transducers; (iii) within the sub-area, dividing the voltage transformers, based on their measured signals, into groups, all of the measured signals in each group coinciding with one another within the tolerated measuring inaccuracies; and (iv) generation of an indication or alarm signal by the control system if more than one group is present. By means of the categorization of the voltage transformers into groups based on their measuring signals, a status of the voltage transformers and, if applicable, of the switchgear can be estimated solely by a relative comparison of the measuring signals from spatially separated voltage transformers without knowledge of the correct voltages. Due to the occurrence of several groups, it can be established that there are inconsistencies between the measured values of the voltage transformers and an appropriate message is produced for the attention of the control system or the operating personnel. The method is independent of the configuration or the network scheme of the primary devices of the switchgear and, in particular, is independent of the complexity of their networking and can thus be implemented for arbitrary schemes without significant adaptations. The method is also independent of the instantaneous operating condition of the switchgear and, in particular, can even be carried out when the target voltage is varying.

The tracking of the topology occurs dynamically, i.e. the topology or the division into sub-areas is updated continuously or on demand. In particular, it can change owing to switching operations. Each sub-area represents a topological part of the switchgear, which has a characteristic target voltage and an actual voltage deviating therefrom in the case of system faults. It is also advantageous that use can be made of measured signals of the voltage transformers that are already available in the substation or switchgear control system. The method is also compatible with conventional local plausibility tests for voltage transformers. In contrast to these, it allows even small deviations or errors in the scaling of voltage transformers to be detected. Furthermore, more serious faults on the primary side or defects in voltage transformers can also be detected.

In a preferred exemplary embodiment, when the indication or alarm signal is present, a number of voltage transformers in each group is determined and the following criteria for judging the state of the voltage transformers are used: (i) If exactly two groups are present and if the first group contains exactly one voltage transformer and the second group contains more than one voltage transformer, then the voltage transformer in the first group is identified as being problematic and is assigned an alarm message, and/or (ii) If at least two groups of equal size or more than two groups are present, then all of the voltage transformers are identified as being problematic; and/or (iii) If a largest group with several voltage transformers and several groups each with exactly one voltage transformer are present, then all of the voltage transformers in the largest group are identified as being accurate or faultless and the other voltage transformers are identified as being problematic. These rules for judging the condition or state are very simple and nevertheless allow a reliable checking of the voltage transformers and the switchgear with little computational effort and without additional measuring effort related to the voltage transformers. In particular, it is not necessary for a correct or an absolute voltage level to be known or to be estimated.

In a further exemplary embodiment, there are further criteria for judging the state of the voltage transformers and/or of the switchgear: (i) If exactly one larger and exactly one smaller group of voltage transformers are present and if the smaller group has more than one voltage transformer, then the sub-area of the switchgear is identified as being problematic; and/or (ii) If exactly one group with several voltage transformers is present, which have a non-vanishing voltage or the averaged group voltage of which is not equal to zero, then all of the warning messages and/or alarm messages for the voltage transformers in the group or in the sub-area and, where applicable, for the sub-area itself are reset.

The exemplary embodiments as claimed in claim 4 have the advantage that the seriousness of the underlying fault in the case of problematic voltage transformers can be estimated and brought to the attention of the operating personnel.

The exemplary embodiments as claimed in claim 5 represent simple solutions for the presentation of the results of the plausibility test in an manner that is intuitively easily to understand.

The exemplary embodiment as claimed in claim 6 has the advantage that faults both in voltage transformers and in the switchgear itself can be recognized.

The exemplary embodiment as claimed in claim 7 has the advantage that it is possible to differentiate between inconsistencies between voltage measuring signals caused by switching operations and inconsistencies caused by actual faults.

The exemplary embodiment as claimed in claim 8 has the advantage that several phases can be monitored at the same time with little effort.

In further aspects, the invention relates to a computer program product and a computer program for the plausibility checking of voltage transformers, the method steps as claimed in claims 1–6 being implemented by program code and, furthermore, a device for carrying out the method and a switchgear comprising the device.

BRIEF DESCRIPTION OF THE DRAWINGS

Further embodiments, advantages and applications of the invention emerge from the dependent claims and from the following description and the figures.

In the figures same parts are designated by the same reference symbols.

DETAILED DESCRIPTION OF THE INVENTION

Figure 1A:
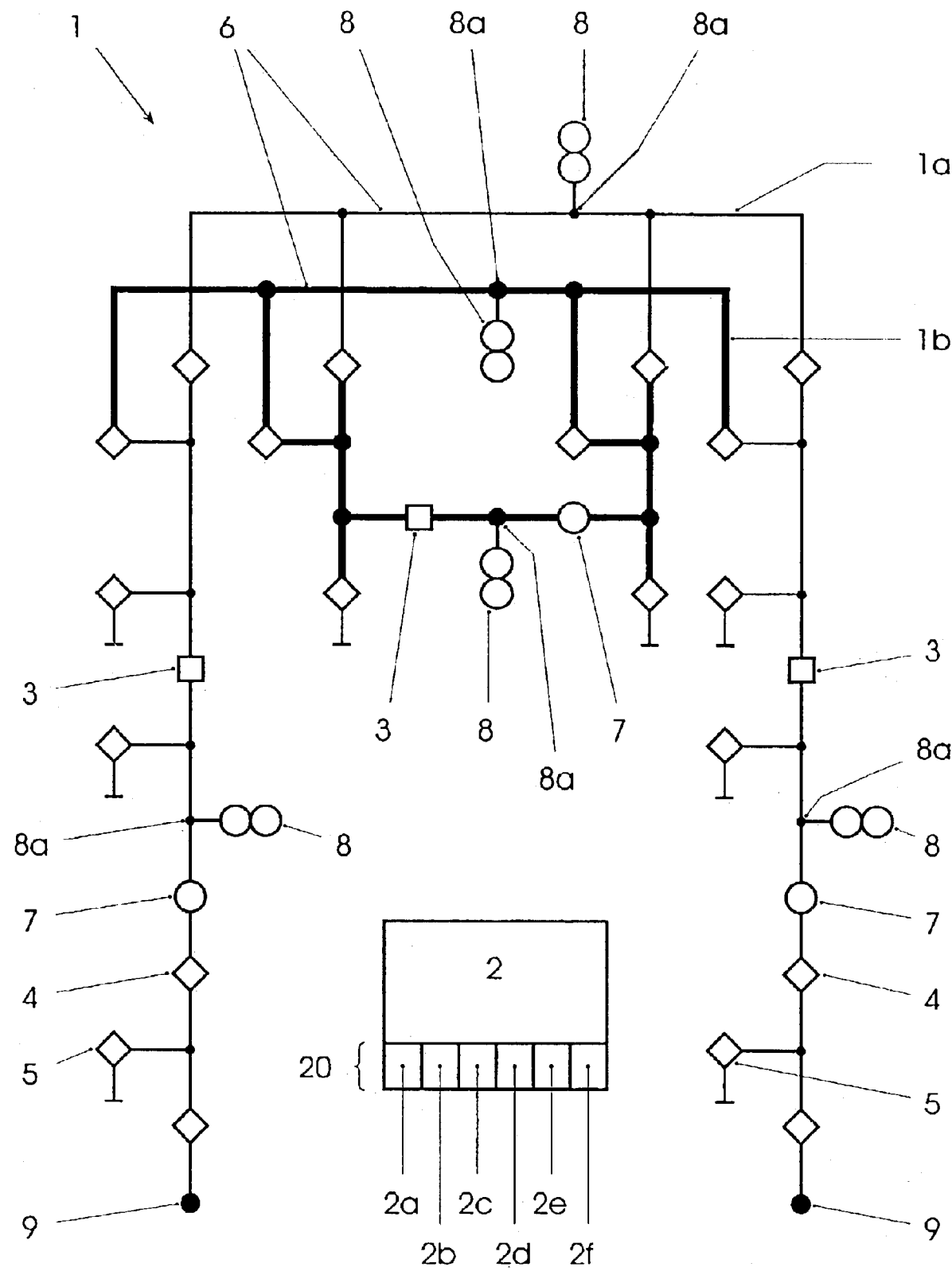
FIG. 1a shows a single-pole scheme in a first topological state defined by switch positions and FIG. 1b shows the single-pole scheme in a second topological state.
Figure 1B:
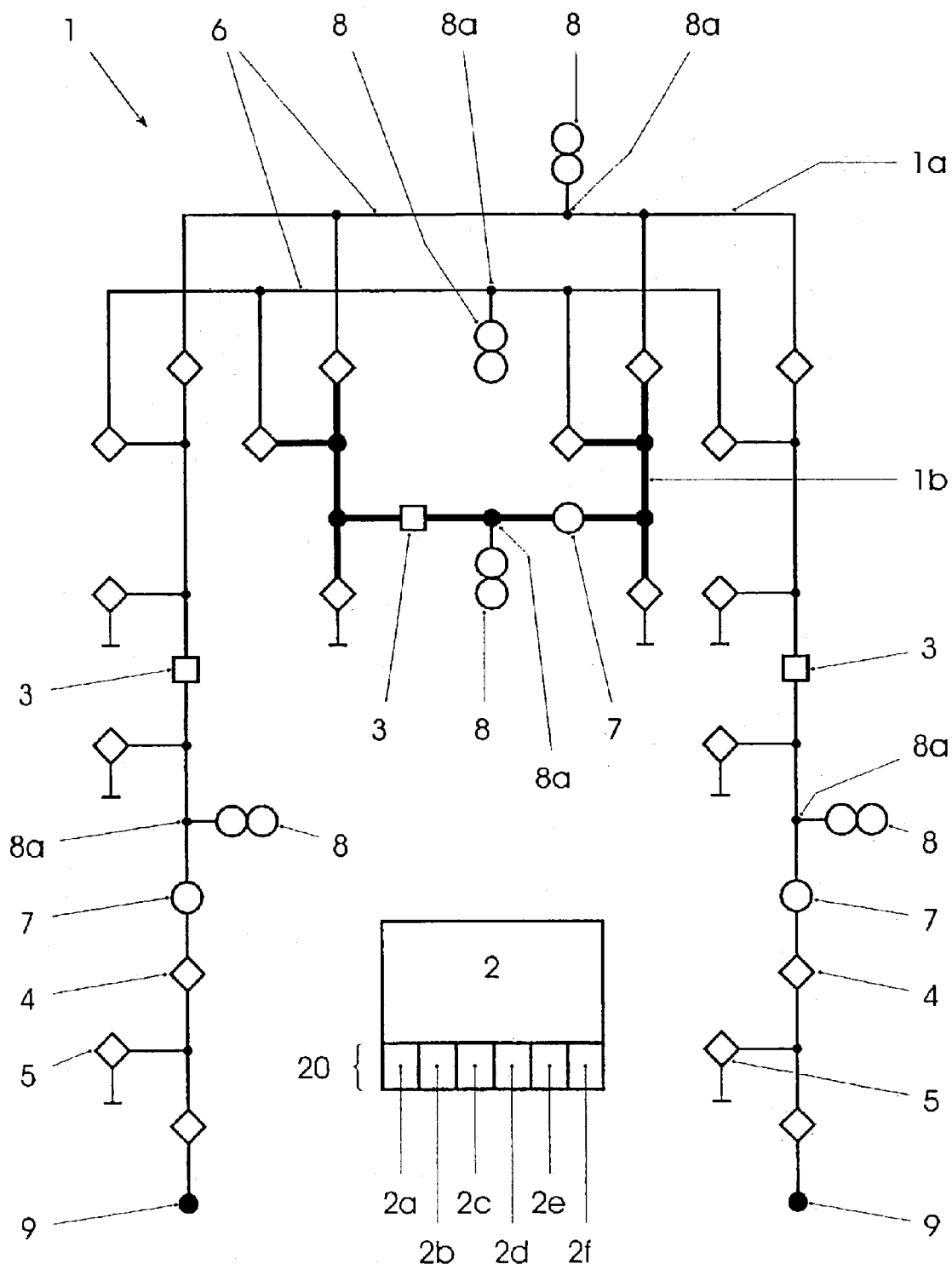

FIGS. 1a and 1b show a single-pole scheme of an electrical high voltage switchgear 1. A substation control system 2 of the switchgear 1 is shown schematically and without connections to the primary devices 3–9 and without reference to its spatial arrangement. 1a, 1b designate topological sub-areas or sub-voltage areas 1a, 1b, which result from the instantaneously assumed position of circuit breakers 3, isolating links 4 and earthing isolators 5. The busbars are designated by 6, the current transformers by 7, the voltage transformers by 8 and the outgoing conductors or lines by 9.

In FIGS. 1a, a first instantaneous topology is shown with a first sub-area 1a and a second sub-area 1b. The second sub-area 1b comprises a voltage transformer 8 on each of the outgoing lines 9 and a voltage transformer 8 on the busbar 6. According to the invention, the measured signals of the three galvanically connected voltage transformers 8 are compared with one another and arranged in groups. The groups are characterized by a voltage band, which is defined, by the permissible measuring error or the allowed or tolerated measuring inaccuracy of the voltage transformers 8, which is typically known a priori. If more than one group is formed, there is a problem either with one measuring transformer 8 or in the sub-area 1a. There are two voltage transformers 8 in sub-area 1b, which are likewise tested for consistency. If their measured values deviate from one another by more than the measurement accuracy, two groups are present and an indication signal or alarm signal is likewise produced. FIG. 1b shows a second topological operating state of the switchgear 1, in which four voltage transformers are galvanically connected in the sub-area 1a. The transition from FIG. 1a to FIG. 1b occurs by the control system tracking the topology and establishing which positions of the switches 3–5 are momentarily active.

Therefore, in the method, the recorded measuring signals are compared, for each sub-area 1a or 1b separately, with one another for identity or consistence within their tolerated measuring inaccuracies, and those voltage transformers 8 are identified the deviations of which from a majoritarian consistency range exceed a specifiable difference value. The difference value is typically greater than or equal to the measuring inaccuracy of the transformers 8. In other words, for the sub-area 1a; 1b, a presumably correct voltage measuring range is determined with a certain probability or plausibility based on the recorded measured signals and the tolerated measuring inaccuracies, and such voltage transformers 8 are identified the measured signals of which fall outside the permissible voltage measurement range.

Exemplary embodiments relate to the following algorithms or criteria for the more accurate judgment of the status of the voltage transformers 8: With exactly one group with one voltage transformer 8 and exactly one group with several voltage transformers 8, the separately or singly grouped voltage transformer 8 is judged to be problematic or faulty and an alarm message is assigned to it. With groups of equal size or with more than two groups, all of the voltage transformers 8 are presumed to be problematic. With a largest group with several voltage transformers 8 and several groups each with exactly one voltage transformer 8, all of the voltage transformers 8 in the largest group are identified as being accurate or fault-free and the other voltage transformers 8 as presumably being problematic.

If exactly one larger and exactly one smaller group of voltage transformers 8 are present, and if the smaller group has more than one voltage transformer 8, then the sub-area 1a; 1b of the switchgear 1 is identified as being presumably problematic. If exactly one group with more than one voltage transformer 8 is present and if the averaged group voltage is not equal to zero, then all warning messages and/or alarm messages for the voltage transformers 8 in the group and thus in the sub-area 1a, 1b and, if applicable, for the sub-area 1a; 1b, are reset.

Several voltage transformers 8 in a group, which is not the largest, are themselves considered as being problematic or their sub-area 1a, 1b is considered as being problematic. In this case, these voltage transformers 8 can be tested for consistency of their measured-value parametrisation and, in particular, of their measured-value scaling. If the measured signals within this group are consistent, a warning signal is generated for a fault voltage in the sub-area 1a; 1b of the switchgear 1, in particular a warning signal for a short circuit or a partial short circuit. For sub-areas 1b with a maximum of two voltage transformers 8, additional local plausibility tests can be carried out.

Voltage transformers 8 in a group, which are identified as being problematic, can be assigned a warning message and their association with a group can be marked. Also, voltage transformers 8, which have been identified as being problematic several times in succession, especially when assigned to different sub-areas 1a, 1b, can be assigned an alarm message.

The results of the plausibility test can be presented in the form of a list of the voltage transformers 8 with their group assignment, a statistic as to how often each voltage transformer 8 has been identified as being problematic, and/or as graphical information, in particular as color information, in a single-pole scheme of the switchgear or substation 1.

In another aspect, the invention relates to a computer program product for the plausibility checking of voltage transformers 8 in an electrical switchgear 1, which includes a computer-readable medium and a means of computer-readable program coding, which, when executed on a data processing means of a control system 2 of the electrical switchgear 1, cause the data processing means to carry out the method presented above. Further, a computer program for the plausibility checking of voltage transformers 8 in an electrical switchgear 1 is claimed, which can be loaded onto and executed on a data processing unit of a control system 2 of the switchgear 1, wherein, when executed, the computer program carries out the steps of the method presented above.

The plausibility test of the voltage transformers 8 can be carried out irrespective of possible switching operations and can be repeated in the case of inconsistencies of the measured signals caused by switching operations, or it can be carried out or evaluated only when a previous check for instantaneous switching operations turned out to be negative.

Furthermore, the plausibility test of the voltage transformers 8 can be carried out separately for each phase or for different phases in turn, in particular cyclically in turn, or for average values of at least two phases, in particular of all phases. It can be carried out when commissioning voltage transformers 8 for the early detection of inconsistencies in their measured-value parametrisation and/or periodically in the operating state of the switchgear 1 and/or after every change in the current topology. In particular, it can be carried out in each sub-area 1a; 1b of the switchgear 1.

In another exemplary embodiment, a busbar voltage in a sub-area 1a; 1b is determined by averaging the measured signals of at least two voltage transformers 8 of the sub-area 1a, which are identified as being fault-free, namely, for example, the transformers 8 arranged at the outgoing lines 9 in FIG. 1a. Consequently, the third transformer 8 on the busbar 6 may be superfluous.

In a further aspect, the invention relates to a device 20 for carrying out the method for the plausibility checking of voltage transformers 8. The device comprises means 2a for the recording of the momentary switchgear topology, means 2b for detecting at least one topological sub-area 1a; 1b of the switchgear 1 with at least two galvanically connected voltage transformers 8, means 2c for classifying the voltage transformers 8 of the sub-area 1a; 1b into groups with measured signals coinciding with one another within the measuring inaccuracy, and means 2d for producing an indication or alarm signal when more than one group is present. Preferably, the device 20 comprises means 2e for judging the condition of the voltage transformers 8 and/or the switchgear 1 according to the algorithms or criteria mentioned above, and/or means 2f for carrying out the method presented above.

The device 20 can be a station monitoring unit 20 that can be connected to the control system 2 or it can be integrated within an operator interface of the control system 2. Further, all said device means 2a–2f can be implemented in hardware and/or software.

The invention also extends to an electrical switchgear or substation 1, which includes such a device 20.

List of References

Electrical switchgear, substation
1a, 1b Sub-areas of the topology
2 Substation control system
20 Device for plausibility checking
2a Means for recording the topology
2b Means for detecting a sub-area
2c Means for transformer classification
2d Means for signal generation
2e Means for judging the state of the transformers
2f Means of execution
3 Circuit breaker 4 Isolating link
5 Earthing isolator
6 Busbar
7 Current transformer
8 Voltage transformer
8a Measuring point of a voltage transformer
9 Outgoing lines

What is claimed is:

1. A method for the plausibility checking of voltage transformers in an electrical switchgear, in particular a high or medium voltage switchgear, the switchgear being controlled by a control system and measured signals from voltage transformers arranged at least two different measuring points being processed by the control system, wherein for testing the plausibility of the voltage transformers
   a) an instantaneous topology of the switchgear is recorded by means of the control system based on the existing electrical connections of primary devices and based on the instantaneous positions of switches,
   b) based on the instantaneous topology, at least one sub-area of the switchgear is identified, which comprises at least two galvanically connected voltage transducers,
   c) within the sub-area the voltage transformers are divided into groups based on their measured signals, all of the measured signals in each group coinciding with one another within the tolerated measuring inaccuracies, and
   d) an indication or alarm signal is generated by the control system if more than one group is present.

2. The method as claimed in claim 1, wherein the following criterion is used: if a group, which is not a largest group, contains several voltage transformers, the voltage transformers of this group are tested for inconsistencies between their measured-value parameters, in particular between their measured-value scaling and, if necessary, are corrected, and/or, if the measured signals within this group are consistent, a warning signal for a fault voltage in the sub-area of the switchgear, in particular a warning signal for a short circuit or a partial short circuit, is generated.

3. The method as claimed in claim 1, wherein
   a) the plausibility test of the voltage transformers is carried out irrespective of possible switching operations and is repeated in the case of inconsistencies of the measured signals caused by switching operations, or
   b) the, plausibility test of the voltage transformers is carried out or evaluated only when a previous check for instantaneous switching operations turned out to be negative.

4. The method as claimed in claim 1, wherein the plausibility test of the voltage transformers is carried out separately for each phase or for different phases in turn, in particular cyclically in turn, or for average values of at least two phases, in particular of all phases.

5. The method as claimed in claim 1, wherein
   a) the plausibility test is carried out when commissioning voltage transformers for the early detection of inconsistencies between their measured-value parametrisation, and/or
   b) the plausibility test is carried out periodically in the operating state of the switchgear and/or after every change of the instantaneous topology, and/or
   c) the plausibility test is carried out in each sub-area of the switchgear.

6. The method as claimed in claim 1, wherein a busbar voltage in a sub-area is determined by averaging the measured signals of at least two voltage transformers of the sub-area, which are identified as being fault-free.

7. The method as claimed in claim 1 wherein, in particular for sub-areas with a maximum of two voltage transformers, additional local plausibility tests are carried out.

8. A computer program product for the plausibility checking of voltage transformers in an electrical switchgear, which comprises a computer-readable medium and a means of computer-readable program coding, which, when executed on a data processing means of a control system of the electrical switchgear, cause the data processing means to carry out the method as claimed in claim 1.

9. A computer program for the plausibility checking of voltage transformers in an electrical switch-gear, which can be loaded onto and executed on a data processing unit of a control system of the switchgear, wherein, when executed, the computer program carries out the steps of the method as claimed in claim 1.

10. The method as claimed in claim 1, wherein, when the indication or alarm signal is present, a number of voltage transformers in each group is determined and the following criteria for judging the state of the voltage transformers are used:
    a) if exactly two groups are present and if the first group contains exactly one voltage transformer and the second group contains more than one voltage transformer, then the voltage transformer in the first group is identified as being problematic and is assigned an alarm message; and/or
    b) if at least two groups of equal size or more than two groups are present, then all of the voltage transformers are identified as being problematic; and/or
    c) if a largest group with several voltage transformers and several groups each with exactly one voltage transformer arc present, then all of the voltage transformers in the largest group are identified as being free from faults and the other voltage transformers are identified as being problematic.

11. The method as claimed in claim 10, wherein the following criteria are used for judging the state of the voltage transformers and/or the switchgear
    a) if exactly one larger and exactly one smaller group of voltage transformers are present and if the smaller group has more than one voltage transformer, then the sub-area of the switchgear is identified as being problematic, and/or
    b) if exactly one group with several voltage transformers is present, which have a non-vanishing voltage, then all of the warning messages and/or alarm messages for the voltage transformers in the group and, where applicable, for the sub-area, are reset.

12. The method as claimed in claim 10, wherein
    a) voltage transformers in a group, which are identified as being problematic, are assigned a warning message and their association with a group is marked, and/or
    b) voltage transformers, which have been identified as being problematic several times in succession when assigned to different sub-areas, are assigned an alarm message.

13. The method as claimed in claim 10, wherein the results of the plausibility test are presented in the form of a list of the voltage transformers with their group assignment, a statistic as to how often each voltage transformer has been identified as being problematic, and/or as graphical information, in particular as color information, in a single-pole scheme of the switchgear.

14. A device for the plausibility checking of voltage transformers in an electrical switchgear, in particular for carrying out the method as claimed in claim 1, wherein being present
- a) means for the recording of an instantaneous topology of the switchgear based on the existing electrical connections of primary devices and based on the instantaneous positions of switches,
- b) means for detecting at least one topological sub-area of the switchgear, which has at least two galvanically connected voltage transformers,
- c) means for classifying the voltage transformers of the sub-area into groups, in each group all of the measured signals of the voltage transformers coinciding with each other within the tolerated measuring inaccuracies, and
- d) means for producing an indication or alarm signal when more than one group is present.

15. The device as claimed in claim 14, wherein
- a) means for judging the state of the voltage transformers and/or the switchgear in accordance with the criteria as claimed in claim 2 are present, and/or
- b) means for carrying out the method as claimed in claim 1 are present.

16. The device as claimed in claim 14, wherein
- a) the device is a station monitoring unit that can be connected to the control system or is integrated within an operator interface of the control system, and/or
- b) said means of the device are implemented in hardware and/or software.

17. An electrical switchgear, in particular a high or medium voltage switchgear, comprising a device as claimed in claim 14.

* * * * *